United States Patent [19]

Kademann

[11] 3,919,948
[45] Nov. 18, 1975

[54] DUAL TRANSMISSION LOCOMOTIVE
[75] Inventor: Siegfried Kademann, Sanderhausen near Kassel, Germany
[73] Assignee: Rheinstahl AG, Essen, Germany
[22] Filed: June 13, 1973
[21] Appl. No.: 369,718

Related U.S. Application Data
[63] Continuation-in-part of Ser. No. 70,937, Sept. 9, 1970, abandoned, which is a continuation of Ser. No. 267,114, March 22, 1963, abandoned.

[30] Foreign Application Priority Data
Feb. 18, 1963   Germany............................ 1214717

[52] U.S. Cl............... 105/341 R; 105/96.2; 105/98; 105/99; 105/108; 105/130; 105/133
[51] Int. Cl. ........ B61c 5/00; B61c 9/14; B61c 9/26
[58] Field of Search ........... 105/96, 96.1, 96.2, 133, 105/34 R, 98, 99, 108, 130; 180/54 C

[56] References Cited
UNITED STATES PATENTS

| | | | |
|---|---|---|---|
| 1,447,488 | 3/1923 | Schneider | 105/96.2 |
| 2,132,450 | 10/1938 | Wolf | 180/54 C |
| 3,270,691 | 9/1966 | Zoellner | 105/133 X |
| 3,576,166 | 4/1971 | Bollmann | 105/96.2 |

Primary Examiner—Lloyd L. King
Assistant Examiner—Howard Beltran
Attorney, Agent, or Firm—Walter Becker

[57] ABSTRACT

A locomotive having trucks and a bridge girder connecting the trucks and having an engine mounted thereon includes a power take-off on each end of the engine, a first pair of drive shafts each connecting one of the power take-offs with a transmission carried by the locomotive frame, and a second pair of drive shafts each connecting one transmission with a distributor gear on a truck. Thereby power from the engine is transmitted to the trucks to drive the locomotive. The second pair of drive shafts connected to sides of the transmissions face toward the same end of the locomotive.

5 Claims, 7 Drawing Figures

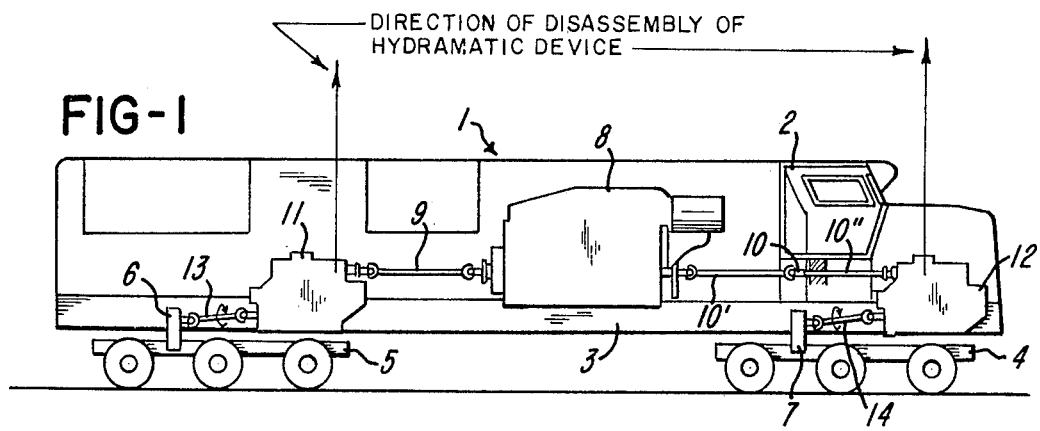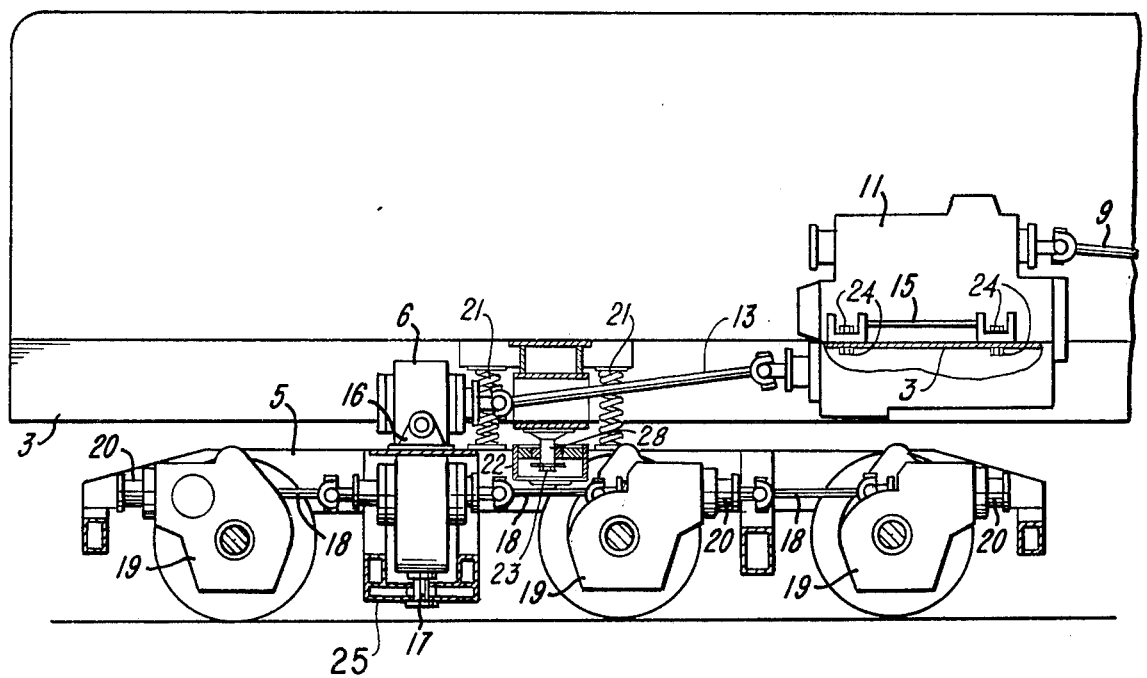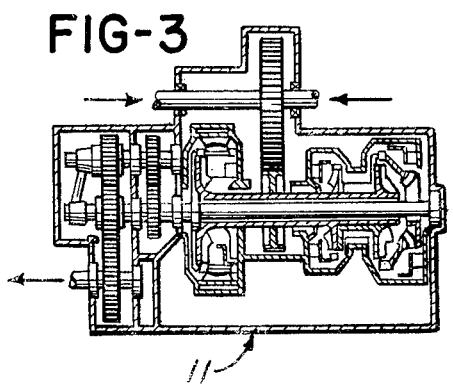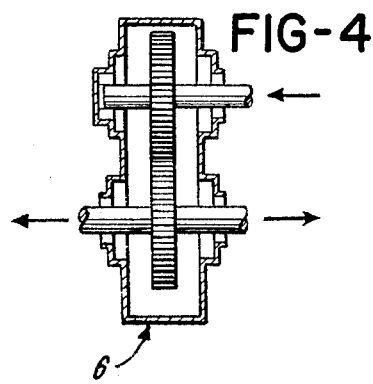

FIG. 5
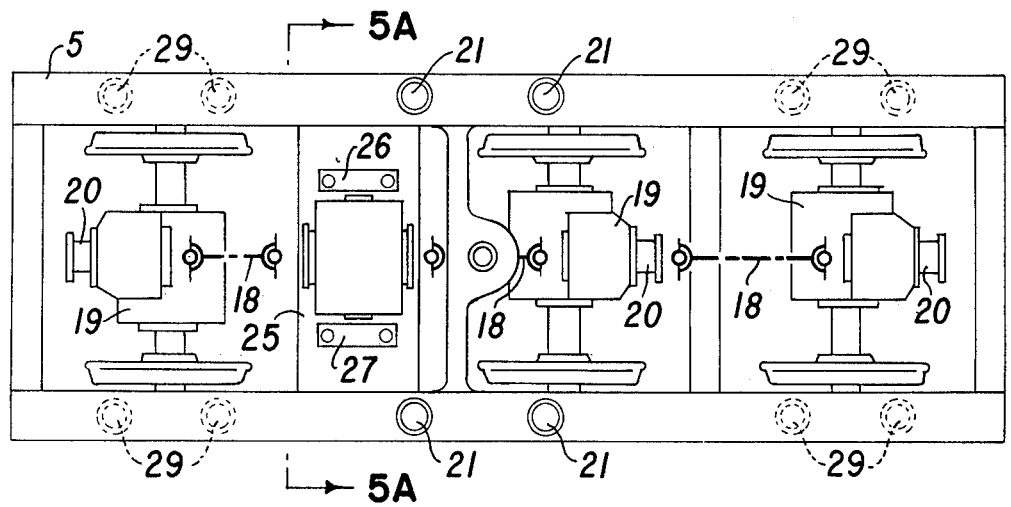
FIG. 4A
FIG. 5A
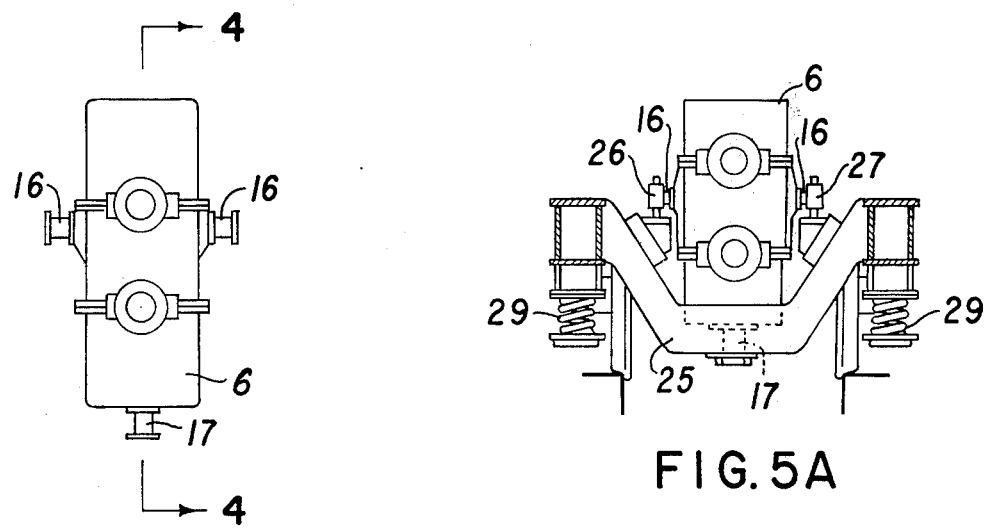

DUAL TRANSMISSION LOCOMOTIVE

This application is a continuation-in-part of co-pending application Ser. No. 70,937 filed Sept. 9, 1970, now abandoned, which is a continuation of then copending application Ser. No. 267,114, filed Mar. 22, 1963, now abandoned.

In high-powered locomotives, the power of the engine is generally utilized to drive two hydraulic transmissions and it has already been proposed to connect the engine to a mechanical transmission which is, in turn, connected to two hydraulic, or fluid, transmissions. In this known arrangement, the power transmission system is arranged essentially symmetrically to the intermediate mechanical transmission. Further, the railway trucks which include one distributor gear each, the latter being arranged outside the transverse center of the trucks, are positioned symmetrically, i.e., in an opposed manner, under the bridge girder of the locomotive since the distributor gears are mounted in a position facing each other.

In the present invention, an improvement in locomotive construction is provided since, first, the intermediate mechanical transmission is eliminated and, second, interchangeable parts may be used.

In the present invention, a locomotive is provided having an engine with a power take-off on each end thereof. Each of a first pair of drive shafts connects one of the power take-offs with a transmission, which may be of either the mechanical or fluid type, and each of a second pair of drive shafts connects one of the transmissions with a distributor gear on one of the railway trucks. The second pair of drive shafts are connected to sides of the transmisssions which face in the same direction. This construction results not only in the elimination of the heretofore required intermediate mechanical transmission, but also permits the use of interchangeable gears, drive shafts, and the like, as well as permitting the spatial location of these components in a manner such that the locomotive may be easily disassembled for overhaul and the like.

In the known symmetrical arrangement, i.e., the opposed arrangement of the railway trucks under the bride girder of a locomotive, the construction of the present invention would result in a reversal of the direction of rotation of one of the distributor gears on one of the trucks and, accordingly, in the present construction, the two trucks are arranged in tandem under the bridge girder, i.e., they face in the same direction. This construction permits, in addition to the use of interchangeable trucks, the use of interchangeable shafts between the two transmissions and the distributor gears on the trucks.

Also, to permit the use of interchangeable shafts between the engine and the two transmissions, in the interest of standardization, the present invention also provides that if one of these drive shafts is longer than the other due to the design of the locomotive, the longer of the two may be divided into two or more sections so that the drive shaft on one end of the engine is identical with at least a portion of the drive shaft on the other end.

The invention will be further illustrated by reference to the accompanying drawings, in which:

FIG. 1 is a schematic diagram in elevation illustrating one embodiment of the present invention.

FIG. 2 is an enlarged fragmentary view to show journalling of the hydraulic drive in the locomotive box or frame.

FIG. 3 diagrammatically illustrates a section of the hydraulic drive on the bridge grider.

FIG. 4 illustrates diagrammatically a distributor gear means in section taken along line 4—4 in FIG. 4.

FIG. 4A shows an end view of transmission means.

A diesel-hydraulic locomotive, generally indicated by the reference numeral 1, has a cab 2 at one end thereof, although it is understood that a cab may be provided at either end thereof if desired. Two railway trucks 4 and 5, respectively, each having three axles with springs 29 supporting the locomotive bridge girder 3. Each truck includes a distributor gear 6 and 7, respectively, these gears being mounted outside of the transverse centers of the trucks. The distributor gears are mounted on the trucks in a manner such that the trucks are in tandem, i.e., they face in the same direction and are interchangeable with each other.

The locomotive is supported for example by way of flexicoil springs 21 upon both sides relative to the frame 4, 5 as represented in FIG. 2. The traction forces are transferred by way of rotational studs through which the pivot shaft 13 passes from the horizontal drive or transmission 11 to the drive or gear means 6. Also the rotary stud 28 (FIG. 2) can easily facilitate and make possible a lifting of the locomotive from the truck by way of loosening of a nut 23. The rotary stud 28 rests in a bearing 22 as shown in FIG. 2. The disassembly of the hydraulic drive or transmission means 11 and 12 occurs vertically upwardly through the top with corresponding openings being provided, and such disassembly occurs after loosening of the pivot shafts 10'', 10, 9 and 13, 14; such disassembly upwardly occurs as indicated by an arrow at a time at the transmission means 11 and 12 after the bolts and nuts 24 and 25 on the bracket or strap means 15 have been loosened. The connection of the bracket 15 occurs relative to the bridge carrier or locomotive frame 3 by way of bolts with nuts. The three-point suspension of the drive or gear means 6, 7 is illustrated additionally in FIG. 4A of the drawings. The additional plan view of FIG. 5 as well as a section 5A—5A therein for FIG. 5A shown next to the side view of FIG. 4A shows structure with which the drive or gear means 6, 7 can be removed vertically. In the present situation the drive or gear means rests upon a cropped frame 25 of the truck 4, 5. Both lateral bearings are designated by reference numerals 26 and 27. After loosening of the connection screws on the bearings 26 and 27 and on three-point journaling means including the studs 16 and 17, as shown in FIGS. 4A and 5A respectively, there is noted that the drive or gear means 6 can be taken out upwardly. The construction elements can be installed, for instance by way of loosening the fastening elements of the brackets 15, 24 and loosening of the pivots of the pivot shafts 13 and 9 by way of the top where corresponding openings are provided.

The drive for the truck axles is derived from the diesel engine 8, the power being supplied from power take-offs on each end thereof through the drive shafts 9 and 10 having suitable universal joints on the ends of each of the shafts. The drive shaft 9 is connected at one end to the engine 8 and at the other end to the transmission 11 while the drive shaft 10 connects at one end to the engine 8 and at the other end to the transmission 12. The transmissions 11 and 12 are of like construction and are mounted similarly on the locomotive 3. Since the engine 8 is not centrally located between the transmissions 11 and 12, the drive shaft 10 is longer than the drive shaft 9 and is additionally supported below the cab 2. This arrangement makes it possible to divide the drive shaft 10 into two sections, 10' and 10'', and to make section 10' identical with the drive shaft 9.

Two identical drive shafts 13 and 14, which rotate in the same direction, connect the transmissions 11 and 12 with the distributor gears 6 and 7, respectively. These drive shafts are connected to sides of the transmissions 11 and 12 which face in the same direction, i.e., they face toward the same end of the locomotive. The driving sides of the transmissions 11 and 12 are shown in the drawing to face toward the rear end of the vehicle but they can, with equal facility, face the front end thereof.

Basically the present invention provides for journalling of the hydraulic drive unit with the entire machine system upon the frame of the locomotive box or construction. This in fact represents a great, essential difference with respect to previously known structures having a motor journalled only upon the locomotive box frame and preceeding then with pivot or drive shafts in the pivot mounting to the hydraulic drive units and from the hydraulic drive units to the distributor drives and from there to the axles. By way of the journalling of the hydraulic drive unit in a pivot mounting as previously known there is accepted and taken into consideration a disadvantageous axle loading with a disadvantageous turning moment torque transfer onto the axles. Consequently, the requirement for simplicity cannot be met or given consideration.

With the arrangement of the present invention with which the machine system and the hydraulic drive unit are connected by way of equally long, exchangeable commercially available drive shafts, there is provided a construction of the hydraulic drive unit that is conceivably straightforward and simple. This construction can proceed thereby that the built-in structure arranged as to the hydraulic drive units can be pulled out or removed upwardly and that the hydraulic drive unit likewise can be disassembled upwardly without requiring that the locomotive is to be lifted from the truck or pivot mounting respectively without need for taking out the pivot mounting or truck. With previously known arrangements in contrast it was necessary for the locomotive construction to be lifted off of the pivot mounting or truck when required to disassemble the hydraulic drive unit out of the pivot mounting or truck. For this purpose it is also necessary that the connection of the oil cooler respectively heat exchanger is released at the hydraulic drive unit with the cooler in the locomotive box or unit. Also, such a connection involves and results in more difficulties than with the arrangement of the hydraulic drive unit in the vehicle frame since with such an arrangement the connection of the heat exchanger of the drive with the cooler needs to be less flexible. In comparison with the arrangement of the hydraulic drive unit in the pivot mounting or truck, there must be produced elastic connections from the hydraulic drive unit to the cooler which is located in the vehicle box.

In the prior art the emphasis and gravity of attention has been placed upon the creation of a locomotive with as short a construction length as possible. While with the present arrangement in the foreground there is more the seeking of a simple and straightforward manner of construction and a more simple assembly and disassembly as well as utilization of the same or uniform parts as much as possible and pivot or drive shafts of the same length are to be used as much as possible. The present invention involves the concept to journal the machine system with a locomotive and the hydraulic drive unit in the locomotive box frame and to connect the machine system with uniformly or equally long pivot shafts with the hydraulic drive units and from there to go with equally long pivot shafts into the pivot mounting or truck and onto the distribution drive. With this arrangement there is created the possibility of using two completely identical hydraulic drive units which are arranged upon the locomotive box frame in identical analogous manner.

The mechanical drives, the equally long drive shafts and the provision of a hydraulic drive unit of a very particular type of construction involve in essence that the drive units are journalled upon the frame of the locomotive. Both pivot mountings or trucks are built together in assembly so that distributor shafts 13 and 14 are in the same direction. Thereby during mass production, the trucks or pivot mountings can be assembled in a synchronized or sequential procedure without the need that subsequently a turning of one of the pivot mountings or trucks about 180° would be needed when the locomotive box is installed thereon.

In summary, there can be noted that the present invention provides a universal joint shaft drive system of a Diesel hydraulic rail drive vehicle especially a locomotive comprising substantially vertically embodied trucks and a main frame means connecting the trucks and having a drive engine mounted thereon. This system comprises two hydraulic drive units 11, 12 mounted in the same direction on the main frame means and including two transmission means, a power take-off on each end of the drive engine 8, a first pair of drive shafts 9, 10' connected with the power take-off respectively with transmission means carried by the main frame means 3. A second pair of drive shafts 13, 14 connect respectively one transmission means and distributor drive gear means respectively on a truck. This second pair of drive shafts 13, 14 extend in the same direction and power is transmitted from the drive engine to the trucks to drive the locomotive. The second pair of drive shafts as best seen in FIG. 1 are connected to sides of the transmission means which face toward the same end of the locomotive. The transmission means are hydraulic and each hydraulic drive unit is installed to be pulled out and removed vertically for disassembly vertically without need to lift the locomotive from the trucks. Distributor drive gear means are mounted on the truck in offset location outside the transverse centers of the latter. The substantially identical embodied trucks 4 and 5 are interchangeable without being reversed. The first pair of drive shafts 9, 10' and the second pair of drive shafts 13, 14 are of equal length and uniformly readily interchangeable. FIG. 2 illustrates journalling of a hydraulic drive unit in a locomotive box.

A "mirror-image" drive arrangement without great complexity represents a need in locomotive development. The present invention represents one step in meeting such a need and in meeting the objects and goal of the improved locomotive system.

FIG. 2 represents the drive arrangement of a truck or bogie of a locomotive according to FIG. 1 with the journalling of the hydraulic drive 11 in bridge carrier or girder means 3 by way of bracket means 15 (for easy interchangeability). The distributor gear means 6 and the three-point journalling means 16 (right and left) and 17 are shown with the frame in FIG. 2 and in FIG. 4A. The view of FIG. 2 illustrates an axle drive means 19 of a conventional and commercially available type that could almost be designated as a normal axle drive means at a time having two drive flanges 20. Above one, respectively two of these drive flanges 20 there are these axle drive means respectively, an axle drive or a wheel set connected between each other by way of linkages or pivot shafts 18 and with the distributor gear means 6. FIG. 3 represents a sectional illustration of arrangement through the hydraulic drive 11. FIG. 4 represents a cross section through the distributor gear means 6. The following more detailed explanation is being given for the arrangement in a functional relationship.

FIG. 2 shows the drive arrangement of a truck according to the features of the invention shown in FIG. 1 including the drive means of the axle drive by way of linkages or pivot shafts. The hydraulic drive means 11, respectively 12, as illustrated must be considered to include journalling on the bridge girder 3 and the distributor gear means 6, respectively 7, must be considered journalled by trucks 4 and 5. From FIG. 2 there is recognizable how straightforward the installation and/or disassembly of the hydraulic drive means 11, respectively 12, can be carried out on the bridge girder 3 from above or upwardly without disassembly of the trucks 4, respectively 5, after the fastening elements as well as the linkages or pivot shafts 9, respectively 10, and 13, respectively 14, have become released. With the construction of the bridge girder 3, there is particular attention to be directed to this feature. The essence and purpose of the journalling on the bridge girder must be considered to include the easy interchangeability and replacement capability therewith.

The journalling of the distributor drive or gear means 6, respectively 7, in the truck 4, respectively 5, likewise is illustrated especially in FIG. 2. As already set forth in the designation of reference numerals, there is to be noted that the distributor drive or gear means is journalled in three points and externally of the turning point or pivot of the truck 4, respectively 5, the same is arranged as clear from the drawing illustration.

The longitudinally sectioned drawing of FIG. 3 shows in a schematic illustration the inner construction of the hydraulic drive 11 (respectively 12) which in essence consists of two converters with post-connected mechanical reversing drives. A sectional view of FIG. 4 illustrates similarly the distributor gear means 6, respectively 7, containing only a pair of gears.

The drawings illustrate clearly the purposeful and meaningful arrangement of the distributor gear means 6 and 7 outside or externally of the pivot or turning point of the truck means 4, respectively 5, and the straightforward manner of the force transfer by way of linkages or pivot shafts onto the axle drive means. This arrangement has been selected in order to be able to use as far as possible normal construction parts which would be effective advantageously during acquisition and interchange thereof. All axle drive means are identically embodied and thereby there results that for all axles the same or identical wheel sets are provided.

From the drawings there is additionally apparent how straightforward and simple the construction of the entire drive means can be considered and how free of problems the construction or interchange becomes carried out for a completely assembled truck 4, respectively 5; this is so primarily because no mirror-image arrangement of the trucks 4 or 5 is necessary.

Hereby the linkages or pivot shafts 13, respectively 14, for the distributor gear means 6, respectively 7, and both lateral steering rods that are not illustrated, respectively the guide elements for the truck, can be secured or released in a suitable manner.

By way of the force transmission by means of the linkages or pivot shafts 13, respectively 14, to the distributor gear means 6, respectively 7, after interchange there is no longer any special breaking in or running-in of the gears necessary with respect to the gear transmission of a type illustrated for instance by U.S. Pat. No. 3,576,166-Bollmann issued Apr. 27, 1971.

It will be obvious to those skilled in the art that many modifications may be made within the scope of the present invention without departing from the spirit thereof, and the invention includes all such modifications.

What I claimed is:

1. A universal joint shaft drive system of a Diesel hydraulic rail drive vehicle especially a locomotive having a body comprising substantially vertically embodied trucks and a main frame means connecting said trucks and having a drive engine mounted thereon, comprising: two hydraulic drive units mounted in the same direction on said main frame means and including two transmission means, a power take-off on each end of the drive engine, a first pair of drive shafts each connecting one of the power take-offs with transmission means carried by the main frame means, a second pair of drive shafts each connecting one transmission means and distributor drive gear means respectively on a truck, whereby power from the drive engine is transmitted to the trucks to drive said locomotive, the second pair of drive shafts being connected to sides of the transmission means which face toward the same end of the locomotive, and means for permitting assembly of said transmission means from above and disassembly thereof upwardly by removal from the trucks when the locomotive body is on the trucks.

2. A shaft drive system of a locomotive according to claim 1 in which the transmission means are hydraulic, and means for each hydraulic drive unit installed to be pulled out and removed vertically for disassembly vertically independently of need to lift the locomotive from the trucks.

3. A shaft drive system of a locomotive according to claim 1 in which the distributor drive gear means are mounted on the trucks in offset location outside the transverse centers of the latter.

4. A shaft drive system of a locomotive according to claim 1 in which the substantially identically embodied trucks are interchangeable without being reversed.

5. A shaft drive system of a locomotive according to claim 1 in which the first pair of drive shafts are of equal length and uniformly readily interchangeable.

* * * * *